US011523265B2

(12) United States Patent
Ahmet et al.

(10) Patent No.: US 11,523,265 B2
(45) Date of Patent: Dec. 6, 2022

(54) SYSTEM AND METHOD FOR GENERATING LOCALIZED EMERGENCY WARNINGS

(71) Applicant: T-Mobile USA, Inc., Bellevue, WA (US)

(72) Inventors: Jeff Ahmet, Issaquah, WA (US); Alan Denis MacDonald, Bellevue, WA (US); Egil Gronstad, Encinitas, CA (US); Raymond Wong, Bellevue, WA (US); Waqas Gull, Bellevue, WA (US); Karri Mikael Kuoppamaki, Redmond, WA (US); Paul Bongaarts, Issaquah, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 17/007,729

(22) Filed: Aug. 31, 2020

(65) Prior Publication Data
US 2022/0070643 A1 Mar. 3, 2022

(51) Int. Cl.
| | |
|---|---|
| *H04M 11/04* | (2006.01) |
| *H04W 4/90* | (2018.01) |
| *H04M 3/51* | (2006.01) |
| *G06K 9/00* | (2022.01) |
| *G06K 9/62* | (2022.01) |
| *H04W 4/06* | (2009.01) |
| *H04W 4/021* | (2018.01) |

(52) U.S. Cl.
CPC ............ *H04W 4/90* (2018.02); *G06K 9/0057* (2013.01); *G06K 9/00536* (2013.01); *G06K 9/6256* (2013.01); *H04M 3/5116* (2013.01); *H04M 11/04* (2013.01); *H04W 4/021* (2013.01); *H04W 4/06* (2013.01); *H04M 2242/04* (2013.01)

(58) Field of Classification Search
CPC ......... H04W 4/90; H04W 4/021; H04W 4/06; H04M 3/5116; H04M 11/04; H04M 2242/04; G06K 9/00536; G06K 9/0057; G06K 9/6256
USPC ............................................ 455/404.2, 404.1
See application file for complete search history.

(56) References Cited

U.S. PATENT DOCUMENTS

| | | | | |
|---|---|---|---|---|
| 2014/0162583 | A1* | 6/2014 | Daly | H04W 4/90 455/404.1 |
| 2015/0327039 | A1* | 11/2015 | Jain | H04W 4/023 455/404.2 |
| 2021/0120394 | A1* | 4/2021 | Martin | H04W 4/21 |

* cited by examiner

*Primary Examiner* — Huy C Ho
(74) *Attorney, Agent, or Firm* — Lee & Hayes, P.C.

(57) ABSTRACT

An emergency determining system configured as part of a cellular or mobile network to receive emergency data from public safety answering points and to evaluate the emergency based at least in part on third party data, network data, and the emergency data. For instance, the emergency determining system may determine a level, a geographic area, and/or a response to the emergency and to broadcast, via the cellular or mobile network, notifications to individual's personal electronic devices within the geographic area to alert the individuals to the emergency and to provide instructions related to an appropriate response by the individual.

19 Claims, 5 Drawing Sheets

SYSTEM AND METHOD FOR GENERATING LOCALIZED EMERGENCY WARNINGS

BACKGROUND

Today, emergency services are efficient at processing emergency notifications and dispatching emergency responders. However, often times, various unaware bystanders are in proximity to the emergency and, depending on the type of emergency, may also be in danger. Unfortunately, conventional emergency notification systems are not efficient at warning bystanders to various type of emergencies and instructing the bystanders as to appropriate actions that may be taken to reduce personal risk posed by the present emergency.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
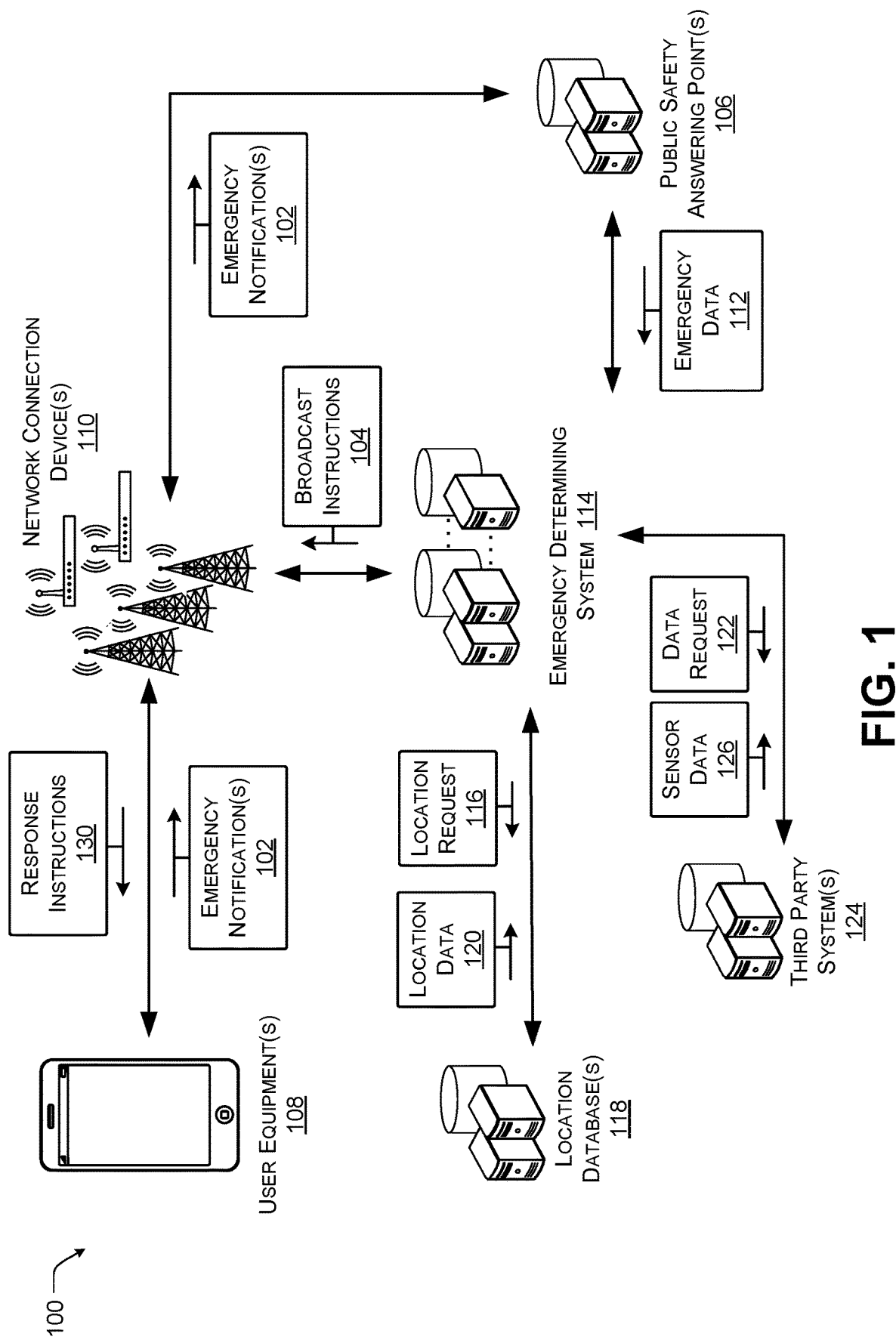
FIG. 1 is an example of a communications network for monitoring emergency notifications and issuing emergency broadcast instructions, in accordance with some examples of the present disclosure.

Discussed herein are systems and methods associated with aggregating emergency notifications and data, classifying emergencies, evaluating risk and threat levels associated with the emergencies, and broadcasting or disseminating warnings to individuals and/or bystanders in proximity to the emergency. For example, the emergency determining system may be configured to receive substantially real-time emergency data from one or more public safety answering points (PSAP). The emergency determining system may process the emergency data using one or more machine learned or trained models to determine a type of emergency and assign a threat or emergency level based on, at least in part, the type, the machine learned models, and the emergency data.

In some cases, the emergency determining system may also determine an area or physical location associated with the emergency. For instance, the emergency determining system may utilize location data associated with each of the emergency notifications provided by the PSAP together with third party location databases to determine an area effected or associated with the emergency. The emergency determining system may then determine instructions to provide to individuals within the area. For example, in the case of a tornado the instructions may include directions to take cover in an underground or interior space. In another case, such as a case of an active shooter, the instructions may include taking shelter indoors, locking exits and entrances, and closing window shades and the like. In still other cases, the instructions may include directions to evacuation points, lists of blockaded or obstructed roads (such as roads blocked by downed trees or electrical wires), areas or physical regions to avoid (such as a path of an active shooter), and the like.

The emergency determining system may then disseminate or broadcast the warnings including the emergency instructions via one or more cellular or mobile networks. In some cases, the broadcast may be to all connected user devices within the area associated with the emergency. In some examples, the emergency determining system may also broadcast an "all clear" or other message when the danger has elapsed.

In some cases, the instructions or the area associated with the emergency may be updated in substantially real-time by the emergency determining system. For instance, in addition to the emergency data received from the PSAP, the emergency determining system may also access various networked sensors, cameras, and the like associated with the one or more cellular or mobile networks. For instance, the emergency determining system may access, retrieve, or receive security cameras or user device or mobile device camera data which may be provided as an additional input to the machine learned models to determine changes with respect to the area and/or the threat or emergency level. For example, in the case of runaway vehicle or active police chase, the area associated with the dangerous vehicle may be consistently changing. Thus, the system, discussed herein, may utilize emergency data from the one or more PSAPs as well as the sensor data from the surrounding area to track and update the physical area associated with the emergency. As the physical area is updated, the emergency determining system may cause additional warnings and instructions to be broadcasts to user devices within the updated area (e.g., new user may receive warnings and sheltering users may receive an "all clear" or "safe to resume activities" notification).

FIG. 1 is an example of a communications network 100 for monitoring emergency notifications 102 and issuing emergency broadcast instructions 104, in accordance with some examples of the present disclosure. In some situations, a public safety answering point 106 may receive a plurality of 911 calls or other types of emergency notifications 102 associated with the same or related emergencies from a plurality of user equipment 108. In some cases, as the emergency notifications 102 are related to the same emergency, the emergency notifications 102 may originate from the user equipment 108 within a definable physical region or area.

In the illustrated example, the public safety answering point 106 may receive the plurality of emergency notifications 102, for instance, via one or more cellular or mobile network connection devices 110. The public safety answering point 106 may determine that the emergency notifications 102 may be related based on one or more criteria. In some cases, the criteria may include a window of time at which the emergency notifications 102 were received, a similarity or correspondence of the network connection devices 110 relaying the emergency notifications 102 (e.g., a common cellular tower or router), a common public safety answering point system or device receives the emergency notifications 102, and the like. Upon determining that the emergency notifications 102 may be related, the public safety answering point 106 may forward or generate an emergency data 112 and send the emergency data 112 to an emergency determining system 114. In an alternative implementation, the public safety answering point 106 may forward each emergency notification 102 to the emergency determining system 114 as emergency data 112. In still other implementations, the public safety answering point 106 may forward each emergency notification 102 that the public safety answering point 106 determines is credible to the emergency determining system 114, for example, as an emergency data 112. For instance, if the public safety answering point 106 alerts emergency responds to the emergency notification 102 then the public safety answering point 106 may also generate a corresponding emergency data 112.

The emergency determining system 114 may determine various emergency characteristics associated with the emergency notifications 102. For instance, the emergency characteristics may include one or more of a relationship between one or more of the emergency notifications 102, a type of emergency associated with the one or more emergency notifications 102, an emergency level associated with the one or more emergency notifications 102, a physical region or area associated with the emergency notifications 102, and the like. In one implementation, the emergency determining system 114 may include one or more machine learned models or networks (such as a neural network) that is trained to determine the emergency characteristics based on the emergency data 112 associated with the one or more emergency notifications 102. For instance, the machine learned models may receive as an input the emergency data, such as audio data of one or more 911 calls, textual data (such as a transcript of one or more 911 calls), metadata (such as cellular tower, router ID, originating device ID, and the like), and the like, and to output a type of emergency (e.g., natural disaster, active shooters, fire, etc.) based on the input data.

In some cases, the emergency determining system 114 may also request, access, and/or receive data related to the emergency notifications 102 from third-party systems. For example, the emergency determining system 114 may issue a location request 116 to a location database 118 in order to receive location data 120 related to the emergency data 112. For example, the location database 118 may include map databases, global position systems (GPS) data, user equipment location tracking databases, such as those associated with the manufactures of the user equipment 108 that sent the emergency notifications 102. In some case, the location data 120 may also be provided as an input to the machine learned model and/or otherwise analyzed to determine a region or area associated with the emergency.

In some cases, the emergency determining system 114 may determine the region by applying a bounding box around a zone defined by the locations of each emergency notification 102 associated with the emergency. A distance may then be applied to the bounding box based on the type of emergency and/or the level of the emergency. For instance, the region associated with a two-alarm fire may be extended ten miles outside of the zone defined by the emergency notifications 102, while the region associated with a four-alarm fire may be extended twenty-five miles outside of the zone. In this manner, the region or area associated with the emergency may be specific to the type of emergency and the severity of the emergency.

The emergency determining system 114 may also issue data requests 122 to a third-party system 124, such as a security system, to retrieve sensor data 126 associated with the region or area of the emergency. For instance, the sensor data 126 may include image data of the region that may be utilized as an input to the machine learned models to assist with determining the type of emergency and/or the emergency level. The sensor data 126 may also include audio data, weather data, air quality data, seismic or vibration related data, traffic data, and the like. Each type of data may assist the emergency determining system 114 in classifying the emergency and assessing the threat or danger to bystanders within the region or area.

In some implementations, the emergency determining system 114 may receive or stream the sensor data 126 and/or the location data 120 from the third-party systems 124 and the location databases 118 during the emergency to assist with determining if the region or area of the emergency has changed and/or if the threat or danger to the bystanders has reduced below a safety threshold.

In the illustrated example, the emergency determining system 114 may generate broadcast instructions 104 associated with the emergency notifications 102 based on the output of the machine learned models. The broadcast instructions 104 may include a region or area associated with the emergency, a type of emergency, a threat or danger level, and/or response instructions 130 to be disseminated to the general public within the region or area. For instance, if the type of emergency is one in which bystanders may be in danger, such as a fire, active shooter, flood, and the like, the emergency determining system 114 may assess or otherwise determine the emergency level. The emergency level may then be compared to various danger or threat thresholds to determine a risk or danger to bystanders within the region or area of the emergency. If the risk exceeds a threshold, then the emergency determining system 114 may issue the broadcast instructions 104 to the cellular or mobile network providers servicing the region. The network connection device 110 of the cellular or mobile network providers may then push the response instructions 130 to the user equipment 108 within the region based on the content of the broadcast instruction 104.

Both the broadcast instructions 104 and the response instructions 130 may include directions to the users of the user equipment 108 to take various actions depending on the type of emergency and the threat or danger level. For example, the directions may be to take cover in the case of severe weather (such as a tornado or hail storm). In another example, the instructions may include an evacuation route, plan, and/or location, such as in response to a flood, fire, or hurricane. In some specific cases, the broadcast instructions 104 and the response instructions 130 may include images, audio files, descriptions, and the like of individuals that may be dangerous. For instance, in the situation of an active shooter, the broadcast instructions 104 and the response instructions 130 may include an image of the face or likeness of the shooter, a vehicle associated with the shooter, and the like. In this example, the broadcast instructions 104 and the response instructions 130 may include an expected location or route of the dangerous individual such that the users may take action to avoid encountering the dangerous individual.

In some implementations, as discussed above, the region or area of the emergency may change. For instance, in the active shooter example, the dangerous individual may be on the move. In this case, the emergency determining system 114 may provide a series of broadcast instructions 104 and the user may receive a series of corresponding response instructions 130 including updates on the emergency, the situation, and the threat or danger level. Individual instances of the response instructions 130 may include different or updated directions for the users to assist the users in avoiding the dangerous individual. In some cases, various broadcast instructions 104 and/or response instructions 130 may be provided to different sets of user equipment 108, such as when a new user equipment enters the region, the region changes, and/or a user equipment 108 exits the regions.

FIGS. 2-5 are flow diagrams illustrating example processes associated with the emergency determining system of FIG. 1 according to some implementations. The processes are illustrated as a collection of blocks in a logical flow diagram, which represent a sequence of operations, some or all of which can be implemented in hardware, software, or a combination thereof. In the context of software, the blocks represent computer-executable instructions stored on one or more computer-readable media that, which when executed by one or more processors, perform the recited operations. Generally, computer-executable instructions include routines, programs, objects, components, encryption, deciphering, compressing, recording, data structures and the like that perform particular functions or implement particular abstract data types.

The order in which the operations are described should not be construed as a limitation. Any number of the described blocks can be combined in any order and/or in parallel to implement the process, or alternative processes, and not all of the blocks need be executed. For discussion purposes, the processes herein are described with reference to the frameworks, architectures and environments described in the examples herein, although the processes may be implemented in a wide variety of other frameworks, architectures or environments.

Figure 2:
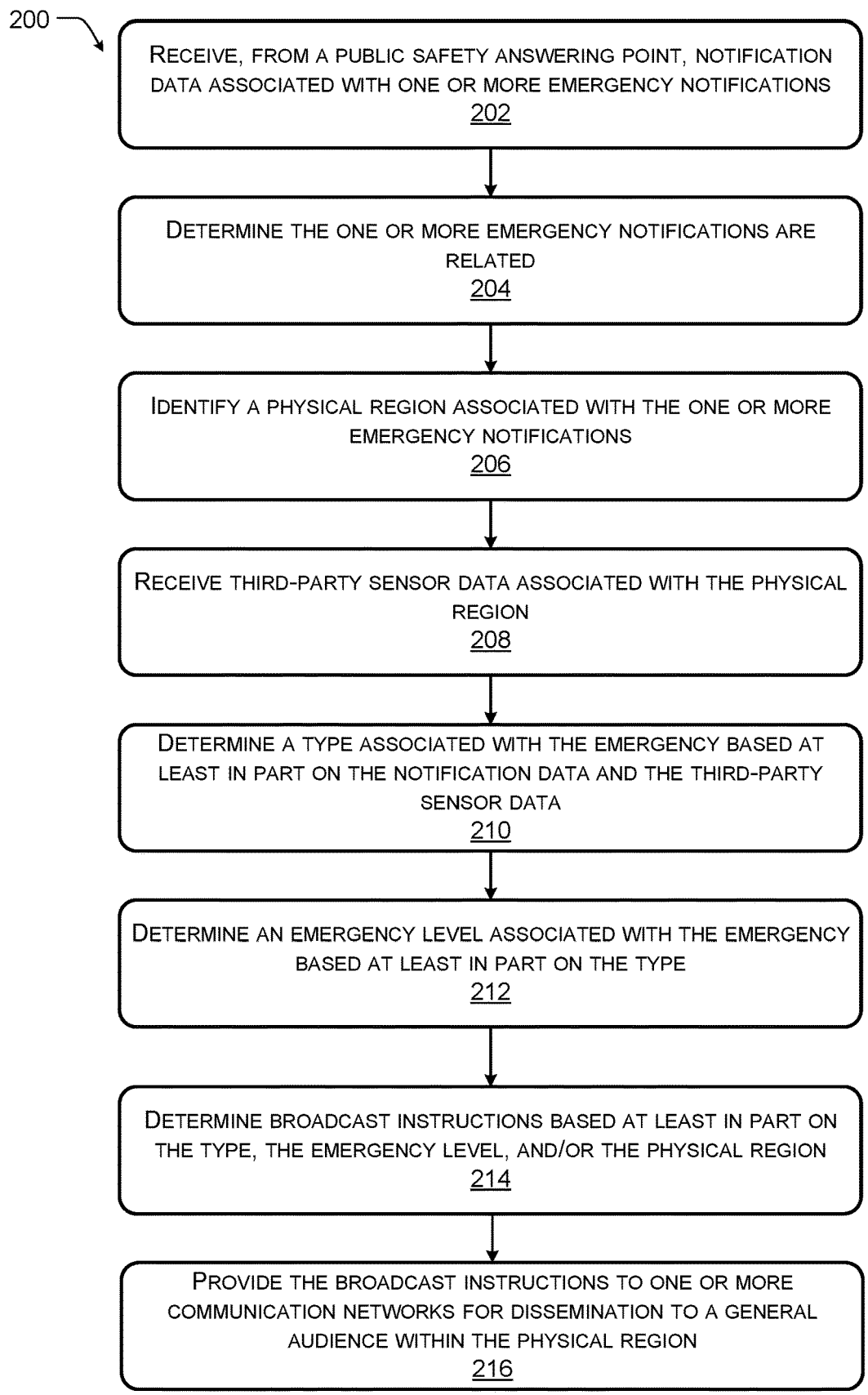
FIG. 2 illustrates an example flow diagram showing an illustrative process associated with classifying an emergency and broadcasting response instructions, in accordance with some examples of the present disclosure.

FIG. 2 illustrates an example flow diagram showing an illustrative process 200 associated with classifying an emergency and broadcasting response instructions, in accordance with some examples of the present disclosure. In some implementations, an emergency determining system may be configured to receive in substantially real-time emergency data from one or more PSAPs. The emergency determining system may process the emergency data using one or more machine learned or trained models to determine a type and severity of the emergency and/or otherwise classify the emergency.

At 202, the emergency determining system may receive, from a PSAP, notification data associated with one or more emergency notifications. The emergency notifications may be received from one or more individuals or user equipment. The emergency notifications may include 911 calls, e911 calls, text messages, or other type of notifications sent to an emergency responder system, such as a PSAP, via an electronic device. In some cases, the data may include the audio data, video data, transcripts of the audio data, textual data, and the like associated with the emergency notification or call. In some examples, the notification data may include location data, such as a location associated with the origination of the 911 call, a GPS position associated with the user equipment providing the emergency notification, a cellular or network tower associated with the user equipment, and the like.

At 204, the emergency determining system may determine that one or more emergency notifications are related. For instance, the emergency determining system may determine that the emergency notifications are related based on a window of time, a similarity of the notification data associated with each notification, or other thresholds. In some cases, the emergency determining system may generate a subset of the notification that are deemed related by the emergency determining system, for instance, when one or more of the emergency notifications received during the window of time includes notification data that is substantially dissimilar to the other notifications. For instance, if ten emergency notifications are received from a PSAP during a five-minute window and nine or the ten include the word fire, while the tenth does not, the emergency determining system may exclude the tenth notification from the subset despite the fact that the tenth notification was received during the window of time.

At 206, the emergency determining system may identify a physical region associated with the one or more emergency notifications or the subset of notifications. The emergency determining system may utilize location data associated with each of the one or more emergency notifications to determine a region or area. For instance, the emergency determining system may determine the physical region by applying a bounding box around a zone defined by the locations of each emergency notifications. In some cases, the bounding box may then be expanded based on the number of notifications or a physical distance between the various origination locations of the notifications. For instance, the bounding box may be expanded by a first distance when greater than a threshold number (e.g., 80%, 90%, 95%, etc.) of the locations are within a five-mile range of each other and by a second distance when the locations are within a ten-mile range of each other. In some cases, the distance the bounding box is expanded may be based on the distance between the two furthest notification origination locations or an average distance between pairs of the notification origination locations At 208, the emergency determining system may receive third-party sensor data associated with the physical region. For instance, the emergency determining system may request data from or access to various systems within the physical region, such as security systems, user equipment (e.g., mobile devices, audio-controlled devices, display devices, cameras or video devices, environmental control and monitoring systems, etc.), networked systems, traffic monitoring systems, and the like. For instance, in one particular example, the emergency determining system may access or stream security camera and audio data from one or more security systems within the physical region.

At 210, the emergency determining system may determine a type associated with the emergency based at least in part on the notification data and the third-party sensor data. For example, the emergency determining system may input the notification data and/or the third-party sensor data into one or more machine learned models or networks. The models or networks may then output a classification or type associated with the emergency. In some cases, determining a type or classification of the emergency may include one or more of preprocessing the notification data and/or the third-party sensor data, segmenting the notification data and/or the third-party sensor data, associating the notification data and/or the third-party sensor data, and classifying the notification data and/or the third-party sensor data. The classification process may also include object detection, filtering, feature extraction, sparse features representation, pattern detection, white space detection, pixel correlation, feature mapping, or other type of data processing and sorting. Some examples, of machine learned models or networks that may be utilized may include deep neural networks, convolutional neural networks, regression techniques. For instance, a neural network may be a biologically inspired algorithm which passes input data through a series of connected layers to produce an output. Each layer in a neural network can also comprise another neural network or can comprise any number of layers (whether convolutional or not). As can be understood in the context of this disclosure, a neural network can utilize machine learning and/or models, which can refer to a broad class of such techniques in which an output is generated based on learned or trained parameters.

In other instances, other types of or combinations of types of machine learning can be used consistent with this disclosure. For example, machine learning algorithms can include, but are not limited to, regression algorithms (e.g., ordinary least squares regression, linear regression, logistic regression, stepwise regression, multivariate adaptive regression splines (MARS), locally estimated scatterplot smoothing), instance-based algorithms (e.g., ridge regression, least absolute shrinkage and selection operator, elastic net, least-angle regression), decisions tree algorithms (e.g., classification and regression tree, iterative dichotomiser 3, Chi-squared automatic interaction detection, decision stump, conditional decision trees), Bayesian algorithms (e.g., naïve Bayes, Gaussian naïve Bayes, multinomial naïve Bayes, average one-dependence estimators, Bayesian belief network, Bayesian networks), clustering algorithms (e.g., k-means, k-medians, expectation maximization, hierarchical clustering), association rule learning algorithms (e.g., perceptron, back-propagation, hopfield network, Radial Basis Function Network), deep learning algorithms (e.g., Deep Boltzmann Machine, Deep Belief Networks, Convolutional Neural Network, Stacked Auto-Encoders), Dimensionality Reduction Algorithms (e.g., Principal Component Analysis, Principal Component Regression, Partial Least Squares Regression, Sammon Mapping, Multidimensional Scaling, Projection Pursuit, Linear Discriminant Analysis, Mixture Discriminant Analysis, Quadratic Discriminant Analysis, Flexible Discriminant Analysis), Ensemble Algorithms (e.g., Boosting, Bootstrapped Aggregation, AdaBoost, Stacked Generalization (blending), Gradient Boosting Machines, Gradient Boosted Regression Trees, Random Forest), support vector machine, supervised learning, unsupervised learning, semi-supervised learning, etc.

At 212, the emergency determining system may determine an emergency level (or threat level) associated with the emergency based at least in part on the type. In some cases, the emergency level may also be based on the extent of the physical region (e.g., the region defined by the bounding box, the distance between the notification origination locations, the averaged distance between the notification origination locations, and the like), the notification data, the third-party sensor data, or other information known about the emergency. For instance, the emergency level associated with an automobile accident may be much lower than an emergency level associated with an armed robbery. As discussed above, the emergency determining system may determine the emergency level using one or more machine learned models or networks in various combinations.

At 214, the emergency determining system may determine broadcast instructions based at least in part on the type of emergency, the emergency level, and/or the physical region. The broadcast instructions may include directions to the cellular and mobile network providers to transmit response instructions, such as push notifications, to user equipment. The broadcast instructions may also include a defined area (e.g., the physical region) in which the cellular and mobile network providers are to transmit the response instructions.

At 216, the emergency determining system may provide the broadcast instructions to one or more communication networks (e.g., the cellular and mobile network providers) for dissemination to a general audience within the physical region. For instance, the cellular and mobile network providers may then transmit the response instructions to each user equipment associated with a tower within the physical region and/or to each user equipment that the cellular and mobile network providers having a location within the physical region.

Figure 3:
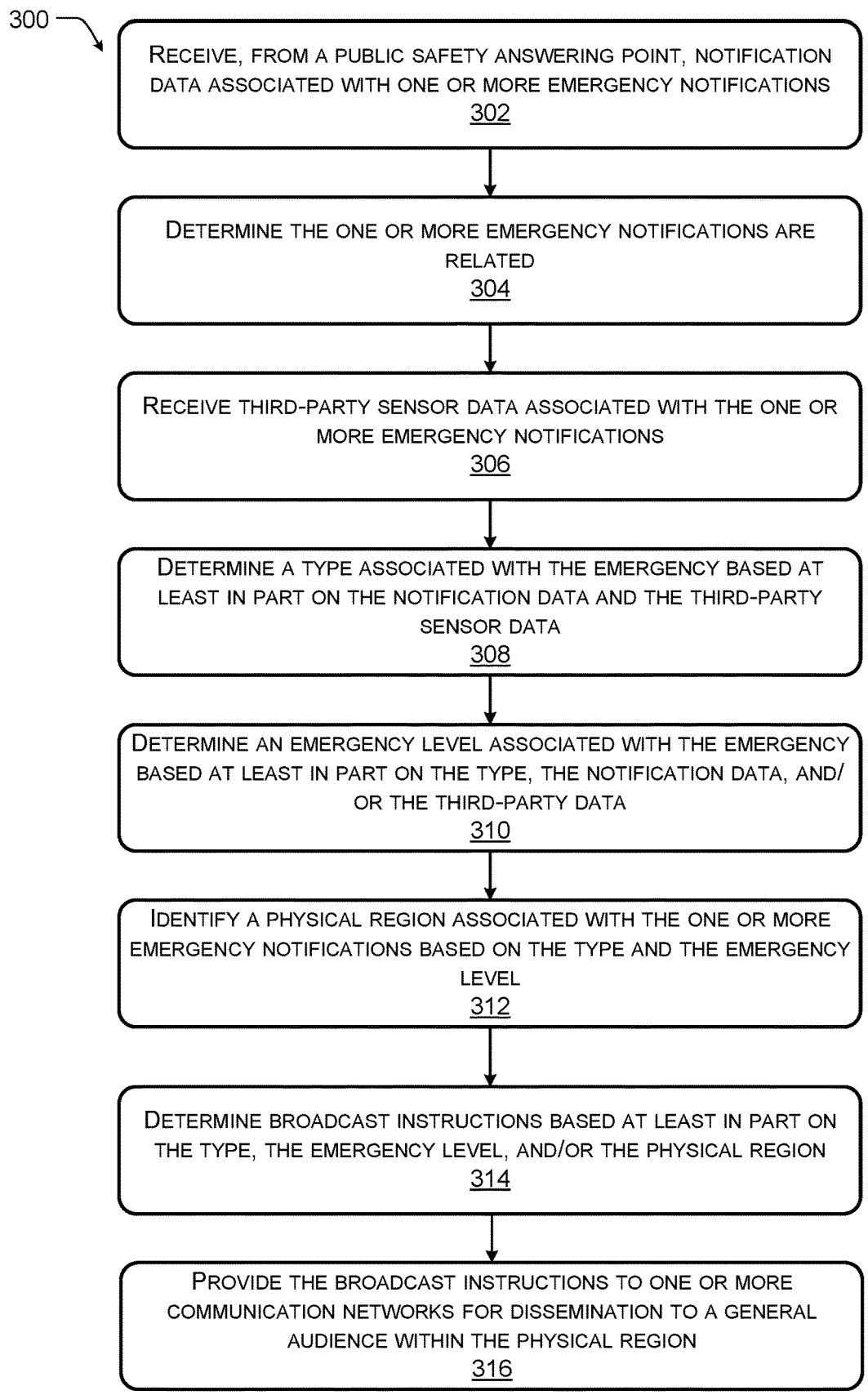
FIG. 3 illustrates another example flow diagram showing an illustrative process associated with classifying an emergency and broadcasting response instructions, in accordance with some examples of the present disclosure.

FIG. 3 illustrates another example flow diagram showing an illustrative process 300 associated with classifying an emergency and broadcasting response instructions, in accordance with some examples of the present disclosure. In some implementations, an emergency determining system may be configured to receive in substantially real-time emergency data from one or more PSAPs. The emergency determining system may process the emergency data using one or more machine learned or trained models to determine a type and severity of the emergency and/or otherwise classify the emergency.

At 302, the emergency determining system may receive, from a PSAP, notification data associated with one or more emergency notifications. The emergency notifications may be received from one or more individuals or user equipment. The emergency notifications may include 911 calls, e911 calls, text messages, or other type of notifications sent to an emergency responder system, such as a PSAP, via an electronic device. As discussed above, the data may include the audio data, video data, transcripts of the audio data, textual data, and the like associated with the emergency notification or call. In some examples, the notification data may include location data, such as a location associated with the origination of the 911 call, a GPS position associated with the user equipment providing the emergency notification, a cellular or network tower associated with the user equipment, and the like.

At 304, the emergency determining system may determine the one or more emergency notifications are related. For instance, the emergency determining system may determine that the emergency notifications are related based on a window of time, a similarity of the notification data associated with each notification, or other thresholds. In some cases, the emergency determining system may generate a subset of the notification that are deemed related by the emergency determining system, for instance, when one or more of the emergency notifications received during the window of time includes notification data that is substantially dissimilar to the other notifications. For instance, if ten emergency notifications are received from a PSAP during a five-minute window and nine of the ten include the word fire, while the tenth does not, the emergency determining system may exclude the tenth notification from the subset despite the fact that the tenth notification was received during the window of time.

At 306, the emergency determining system may receive third-party sensor data associated with the one or more notifications. For instance, the emergency determining system may request data from or access to various systems within an area around individual one of the user devices that send the notifications. As discussed above, the third-party systems may include security systems, user equipment (e.g., mobile devices, audio-controlled devices, display devices, cameras or video devices, environmental control and monitoring systems, etc.), networked systems, traffic monitoring systems, and the like.

At 308, the emergency determining system may determine a type associated with the emergency based at least in part on the notification data and the third-party sensor data. For example, the emergency determining system may input the notification data and/or the third-party sensor data into one or more machine learned models or networks. The models or networks may then output a classification or type associated with the emergency.

At 310, the emergency determining system may determine an emergency level (or threat level) associated with the emergency based at least in part on the type of emergency, the notification data, and/or the third-party data. In some cases, the emergency level may provide the type, the notification data, and/or the third-party data as an input to one or more additional machine learned models or networks and receive as an output the emergency level. In some cases, the emergency determining system may utilize the same machine learned models and/or networks to output both the type of emergency and the level of the emergency. For instance, the type and level may be output as different heads of a machine learned network.

At 312, the emergency determining system may identify a physical region associated with the one or more emergency notifications or the subset of notifications. The emergency determining system may utilize location data associated with each of the one or more emergency notifications to determine a region or area. For instance, the emergency determining system may determine the physical region by applying a bounding box around a zone defined by the locations of each emergency notifications. In some cases, the bounding box may then be expanded based on the type of emergency and/or the level of the emergency. For instance, the physical region associated with a two-alarm fire may be extended ten miles outside of the zone defined by the emergency notifications 102, while a four-alarm fire may extend the physical region by twenty-five miles outside of the zone. In this manner, the physical region or area associated with the emergency may be specific to the type of emergency and the severity of the emergency. In some cases, the type of emergency may also define the direction and/or size of region. For instance, an emergency including a hit and run may extend the physical region by 20 miles in a direction associated with a determined direction of travel of the runaway vehicle and by 5 miles in a direction opposite the direction of travel.

At 314, the emergency determining system may determine broadcast instructions based at least in part on the type, the emergency level, and/or the physical region. The broadcast instructions may include directions to the cellular and mobile network providers to transmit response instruction, such as push notifications, to user equipment. The broadcast instructions may also include a defined area (e.g., the physical region) in which the cellular and mobile network providers are to transmit the response instructions.

At 316, the emergency determining system may provide the broadcast instructions to one or more communication networks (e.g., the cellular and mobile network providers) for dissemination to a general audience within the physical region. For instance, the cellular and mobile network providers may then transmit the response instructions to each user equipment associated with a tower within the physical region and/or to each user equipment that the cellular and mobile network providers having a location within the physical region.

Figure 4:
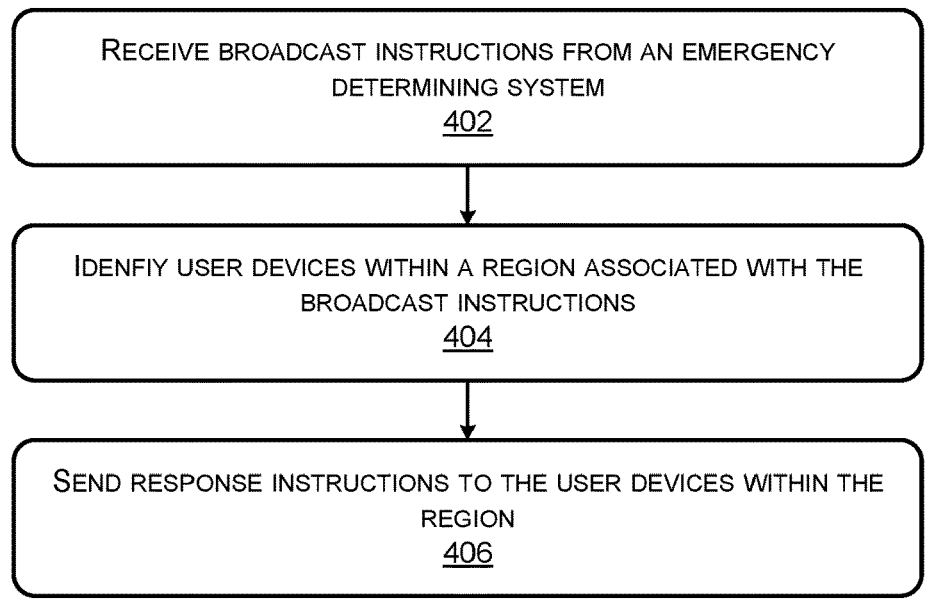
FIG. 4 illustrates an example flow diagram showing an illustrative process associated with broadcasting response instructions, in accordance with some examples of the present disclosure.

FIG. 4 illustrates an example flow diagram showing an illustrative process associated with broadcasting response instructions, in accordance with some examples of the present disclosure. As discussed above, the cellular or mobile network may be utilized to quickly broadcast calls, notifications, text messages, and the like to individuals within a region to, at the least, alert individuals to a nearby emergency.

At 402, the cellular or mobile network provider may receive broadcast instructions from an emergency determining system. The emergency determining instructions may include response instructions that may be of assistance for the individuals in danger with respect to the detected emergency, and an area or region in which to broadcast. In some cases, the broadcast instructions and/or the response instructions may include a type of the emergency, a severity or other emergency level, and/or instruction for the end user to take upon receiving the response instructions.

At 404, the cellular or mobile network provider may identify user devices within a region associated with the broadcast instructions. For instance, the cellular or mobile network provider may identify user devices associated or in communication with cellular towers or other communication infrastructure that is physically situated within the region associated with the emergency or indicated in the broadcast instructions.

At 406, the cellular or mobile network provider may send the response instructions to the user devices within the region. For example, the cellular or mobile network provider may send a push notification, place an automated call to the user devices, and the like within the region. In some cases, the cellular or mobile network provider may cause the user devices to output an audible, physical (vibration), or other type of notification to the user until the user confirms that the user has viewed and understands the emergency. In some cases, the cellular or mobile network provider may also be provided secondary or additional response instructions to the user devices within the region in response to receiving additional broadcast instructions from the emergency determining system, such as when the emergency is in a state of flux or change.

Figure 5:
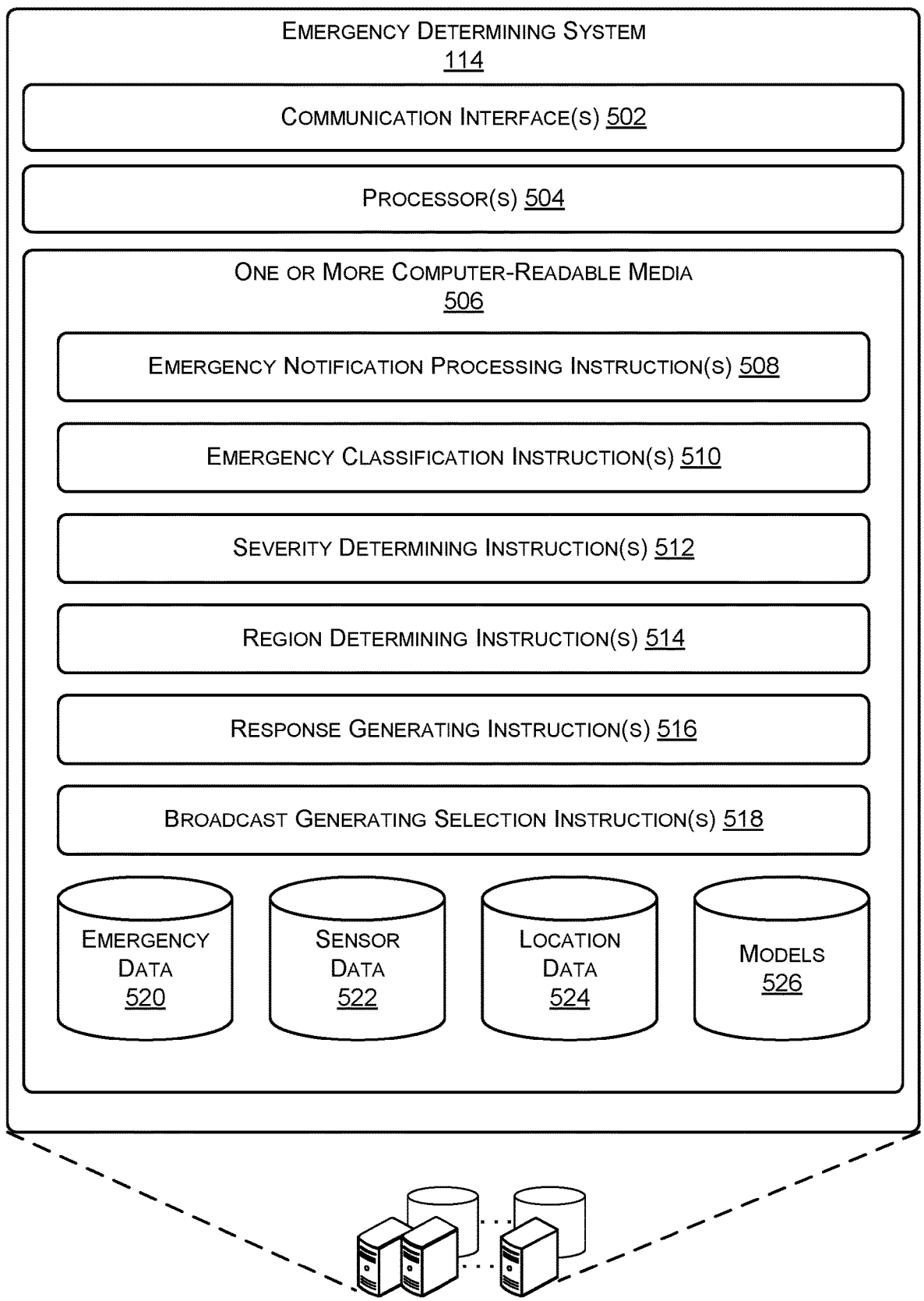
FIG. 5 illustrates an example hardware associated with the emergency determining system of FIG. 1, in accordance with some examples of the present disclosure.

FIG. 5 illustrates an example hardware associated with the emergency determining system of FIG. 1, in accordance with some examples of the present disclosure. As discussed above, the emergency determining system may receive emergency data from one or more PSAPs, location data from one or more location databases, and sensor data from one or more third-party systems. The emergency determining system may then identify, classify, and otherwise evaluate emergencies based on the received data. The emergency determining system may then generate and transmit broadcast instructions and response instructions to be disseminated by the cellular and mobile networks, as discussed herein.

In some implementations, the emergency determining system 114 may include one or more communication interfaces 502 configured to facilitate communication between one or more networks, one or more cloud-based systems, and/or one or more devices, such as location databases, PSAPs, and/or third-party systems. The communication interfaces 502 may also facilitate communication between one or more cellular or mobile communication networks. The communication interfaces 502 may support both wired and wireless connection to various networks, such as cellular networks, radio, WiFi networks, infrared signals, local area networks, wide area networks, the Internet, and so forth. In some cases, the communication interfaces 502 may be configured to receive emergency data from one or more PSAPs, location data from one or more location databases, and sensor data from one or more third-party systems.

The processor(s) 504 can represent, for example, a central processing unit (CPU)-type processing unit, a Field-Programmable Gate Array (FPGA), another class of Digital Signal Processor (DSP), or other hardware logic components that can, in some instances, be driven by a CPU. For example, and without limitation, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), etc. Additionally, each of the processor(s) 504 may possess its own local memory, which also can store program modules, program data, and/or one or more operating systems.

Depending on the exact configuration and type of the emergency determining system 114, the computer-readable media 506, may include computer storage media and/or communication media. Computer storage media can include volatile memory, nonvolatile memory, and/or other persistent and/or auxiliary computer storage media, removable and non-removable computer storage media implemented in any method or technology for storage of information such as computer readable instructions, data structures, program modules, or other data. Computer memory is an example of computer storage media. Thus, computer storage media includes tangible and/or physical forms of media included in a device and/or hardware component that is part of a device or external to a device, including but not limited to random-access memory (RAM), static random-access memory (SRAM), dynamic random-access memory (DRAM), phase change memory (PRAM), read-only memory (ROM), erasable programmable read-only memory (EPROM), electrically erasable programmable read-only memory (EEPROM), flash memory, compact disc read-only memory (CD-ROM), digital versatile discs (DVDs), optical cards or other optical storage media, miniature hard drives, memory cards, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In at least one example, the computer storage media 506 can include non-transitory computer-readable media. Non-transitory computer-readable media can include volatile and nonvolatile, removable and non-removable tangible, physical media implemented in technology for storage of information, such as computer readable instructions, data structures, program modules, or other data. The computer-readable media 506 is an example of non-transitory computer-readable media. Non-transitory computer-readable media include, but are not limited to, RAM, ROM, EEPROM, flash memory or other memory technology, CD-ROM, DVDs or other optical storage, magnetic cassettes, magnetic tape, magnetic disk storage or other magnetic storage devices, or any other tangible, physical medium which can be used to store the desired information. Any such non-transitory computer-readable media can be part of the emergency determining system 114.

The computer-readable media 506 can include one or more modules and data structures including, for example, emergency notification processing instructions 508, emergency classification instructions 510, severity determining instructions 512, region determining instructions 514, response generating instructions 516, broadcast generating instructions 518, as well as other instructions, such as an operating system. The one or more modules, instruction sets, and data structures can be in the form of stand-alone applications, productivity applications, an operating system component, or any other application or software module configured to perform operations as described herein. The computer-readable media 506 may also store data, such as emergency data 520 received from one or more PSAPs, sensor data 522 received from one or more third-party systems (such as security systems and the like), location data 524 from one or more location databases, and one or more models 526 (such as one or more machine learned or trained models usable by the instructions 508-516).

The emergency notification processing instructions 508 may be configured to process the emergency data associated with one or more emergency notifications received from one or more PSAPs and to determine if the emergency notifications are related (e.g., associated with the same emergency). In some cases, the emergency notification processing instructions 508 may group or otherwise organize the one or more emergency notifications into sets for further processing. In some cases, one or more machine learned models 526 may be utilized to assist with grouping and/or organizing the one or more emergency notifications.

The emergency classification instructions 510 may be configured to receive a set or group of related emergency notifications. The emergency classification instructions 510 may determine a type associated with the emergency based at least in part on the emergency data 520 and the third-party sensor data 522. For example, the emergency classification instructions 510 may input the emergency data 520 and/or the third-party sensor data 522 into one or more machine learned models 526. As discussed above, the models 526 (or networks) may then output a classification or type associated with the emergency. In some cases, determining a type or classification of the emergency may include one or more of preprocessing the notification data and/or the third-party sensor data, segmenting the emergency data 520 and the third-party sensor data 522, associating the emergency data 520 and the third-party sensor data 522, and classifying the emergency data 520 and the third-party sensor data 522.

The severity determining instructions 512 may determine an emergency level (or threat level) associated with the emergency based at least in part on the type, the emergency data 520, and/or the third-party sensor data 522. In some cases, the emergency level may also be based on the location data 524 and/or the extent of the physical region determined by the region determining instructions 514. For instance, the emergency level associated with an automobile accident may be much lower than an emergency level associated with an armed robbery. Likewise, an emergency in a populated urban area may be higher than a similar emergency in a rural area. Again, the severity determining instructions 512 may determine the emergency level using one or more machine learned models 526.

The region determining instructions 514 may identify a physical region associated with a set or group of emergency notifications. The region determining instructions 514 may utilize location data associated with each of the one or more emergency notifications to determine a region or area. In some cases, the location data associated with each of the one or more emergency notifications may be position data, GPS data, cellular tower data, and the like associated with the device issuing the emergency notification. In one example, the region determining instructions 514 may determine the physical region by applying a bounding box around a zone defined by the locations of each emergency notifications. In some cases, the emergency data 520, third-party sensor data 522, and the models may also be used to assist with determining the region.

In some cases, the bounding box may then be expanded based on the type of emergency and/or the level of the emergency. For instance, the physical region associated with a tornado may be extended ten miles outside of the zone defined by the emergency notifications, while physical region associated with a hurricane may extend the physical region by 100 miles outside of the zone. In this manner, the physical region or area associated with the emergency may be specific to the type of emergency and the severity of the emergency. In some cases, the type of emergency may also define the direction and/or size of the region. For instance, an emergency including a hit and run may extend the physical region by 20 miles in a direction associated with a determined direction of travel of the runaway vehicle and by 5 miles in a direction opposite the direction of travel.

The response generating instructions 516 may be configured to generate a response or instructions to an end user or individual within the region associated with the emergency. For instance, the response generating instructions 516 may process (such as via a machine learned model 526) the type of emergency, level, emergency data 520, sensor data 522, the region, and the like to generate a set of steps that the individual may take to reduce the risk associated with the emergency at hand. For instance, the response instructions may include direction to take cover in the event of a tornado, to clear off specific roads in the case of a runaway vehicle, or to head to specific evacuation points in the event of a fire, flood, or hurricane.

The broadcast generating instructions 518 may be configured to generate instructions for the cellular or mobile provider to issue the response instructions. For instance, the broadcast generating instructions 518 may process (such as via a machine learned model 526) the type of emergency, level, emergency data 520, sensor data 522, the region, and the like to determine specific regions to receive the response instructions as well as to determine a method of delivery (such as notification, call, alert, etc.).

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computer-implemented method comprising:
   receiving emergency notification data from a public safety answering point (PSAP) server, the emergency notification data associated with an emergency;
   determining a first physical region associated with the emergency notification data;
   requesting first sensor data associated with the first physical region from one or more third party systems within the first physical region;
   receiving, at least partially in response to requesting, the first sensor data associated with the first physical region from the one or more third party systems within the first physical region;
   determining a classification of the emergency based at least in part on the emergency notification data and the sensor data;
   broadcasting, via a mobile device network, an alert warning including the classification of the emergency and response instructions;
   requesting second sensor data associated with the first physical region from the one or more third party systems within the first physical region; and
   broadcasting, via the mobile device network, an updated alert warning based at least in part on the second sensor data and including at least updated response instructions.

2. The computer-implemented method as claim 1 recites, wherein determining the classification of the emergency includes inputting the emergency notification data and the first sensor data into a machine learned model and receiving the classification as an output from the machine learned model.

3. The computer-implemented method as claim 1 recites, further comprising:
   sending a request to one or more sensors for the first sensor data; and
   wherein receiving the first sensor data associated with the first physical region is at least partially in response to requesting the first sensor data.

4. The computer-implemented method as claim 1 recites, wherein the first sensor data includes at least one of audio data associated with the first physical region or image data associated with the first physical region.

5. The computer-implemented method as claim 1 recites, further comprising:
   receiving location data from a location database; and
   wherein determining the first physical region is based at least in part on the location data.

6. The computer-implemented method as claim 1 recites, further comprising:
   determining a second physical region based at least in part on the first physical region and the classification of the emergency; and
   wherein the alert warning is broadcast within the second physical region.

7. The computer-implemented method as claim 1 recites, further comprising:
   receiving additional emergency notification data from the PSAP server;
   determining that the additional emergency notification data is associated with the emergency;
   determining a second physical region associated with the additional emergency notification data, the second physical region different than the first physical region;
   broadcasting, via the mobile device network and within the first physical region, an emergency clearance message; and
   broadcasting, via the mobile device network and within the second physical region, an updated alert warning, the updated alert warning including the classification of the emergency and the response instructions.

8. A system comprising:
   one or more communication interfaces;
   one or more processors;
   non-transitory computer-readable media storing computer-executable instructions, which when executed by the one or more processors cause the one or more processors to perform operations including:
      receiving, at least partially via the one or more communication interfaces, emergency notification data from a public safety answering point (PSAP) server, the emergency notification data associated with an emergency;
      determining a first physical region associated with the emergency notification data;

requesting, at least partially via the one or more communication interfaces, first sensor data associated with the first physical region from one or more third party systems within the first physical region;

receiving, at least partially in response to requesting, the first sensor data associated with the first physical region from the one or more third party systems within the first physical region;

determining a classification of the emergency based at least in part on the emergency notification data and the first sensor data;

determining broadcast instructions associated with the emergency based at least in part on the classification and the first physical region;

sending, at least partially via the one or more communication interfaces, the broadcast instructions to a cellular network provider;

requesting second sensor data associated with the first physical region from the one or more third party systems within the first physical region;

determining updated broadcast instructions associated with the emergency based at least in part on the second sensor data; and sending, at least partially via the one or more communication interfaces, the updated broadcast instructions to the cellular network provider.

9. The system as recited in claim 8, wherein the non-transitory computer-readable media stores additional computer-executable instructions, which when executed by the one or more processors cause the one or more processors to perform operations including generating response instructions based at least in part on the classification and the first physical region and wherein the broadcast instructions include the response instructions.

10. The system as recited in claim 8, wherein the non-transitory computer-readable media stores additional computer-executable instructions, which when executed by the one or more processors cause the one or more processors to perform operations including determining a second physical region based at least in part on the first physical region and the classification of the emergency and wherein the broadcast instructions are associated with the second physical region.

11. The system as recited in claim 8, wherein the non-transitory computer-readable media stores additional computer-executable instructions, which when executed by the one or more processors cause the one or more processors to perform operations including:

receiving additional emergency notification data from the PSAP server;

determining that the additional emergency notification data is associated with the emergency;

determining a second physical region associated with the additional emergency notification data, the second physical region different than the first physical region;

determining additional broadcast instructions associated with the emergency based at least in part on the second physical region; and sending, at least partially via the one or more communication interfaces, the additional broadcast instructions to the cellular network provider.

12. The system as recited in claim 8, wherein the non-transitory computer-readable media stores additional computer-executable instructions, which when executed by the one or more processors cause the one or more processors to perform operations including:

determining a second physical region associated with the emergency based at least in part on the first physical region and the classification; and wherein the broadcast instructions instruct the cellular network provider to send the response instructions to user devices within the second physical region.

13. The system as recited in claim 12, wherein the second physical region is based at least in part on the first sensor data associated with the first physical region from third party systems or on the second sensor data associated with the first physical region from third party systems.

14. The system as recited in claim 8, wherein the first sensor data includes at least one of audio data associated with the first physical region or image data associated with the first physical region.

15. A method comprising:

receiving emergency notification data from a public safety answering point (PSAP) server, the emergency notification data associated with an emergency;

determining a first physical region associated with the emergency notification data;

requesting first sensor data associated with the first physical region from one or more third party systems within the first physical region;

receiving, at least partially in response to requesting, the first sensor data associated with the first physical region from the one or more third party systems within the first physical region;

determining a classification of the emergency based at least in part on the emergency notification data and based at least in part on the first sensor data;

causing, via a cellular network, to send an alert including the classification of the emergency;

requesting second sensor data associated with the first physical region from the one or more third party systems within the first physical region; and causing, via the cellular network, to send an updated alert warning based at least in part on the second sensor data.

16. The method as claim 15 recites, further comprising:

receiving location data from a location database; and wherein determining the first physical region is based at least in part on the location data.

17. The method as claim 15 recites, wherein the alert is sent to user devices within the first physical region.

18. The method as claim 15 recites, further comprising determining a second physical region based at least in part on the first physical region and the classification and wherein the alert is sent to user devices within the first physical region.

19. The method as claim 15 recites, wherein the alert includes the classification.

* * * * *